J. E. THORNTON.
DAYLIGHT LOADING FILM PACK.
APPLICATION FILED MAY 20, 1907.

915,126.

Patented Mar. 16, 1909.
7 SHEETS—SHEET 1.

WITNESSES.
E. Howard
Joseph Bates.

INVENTOR.
J. E. Thornton

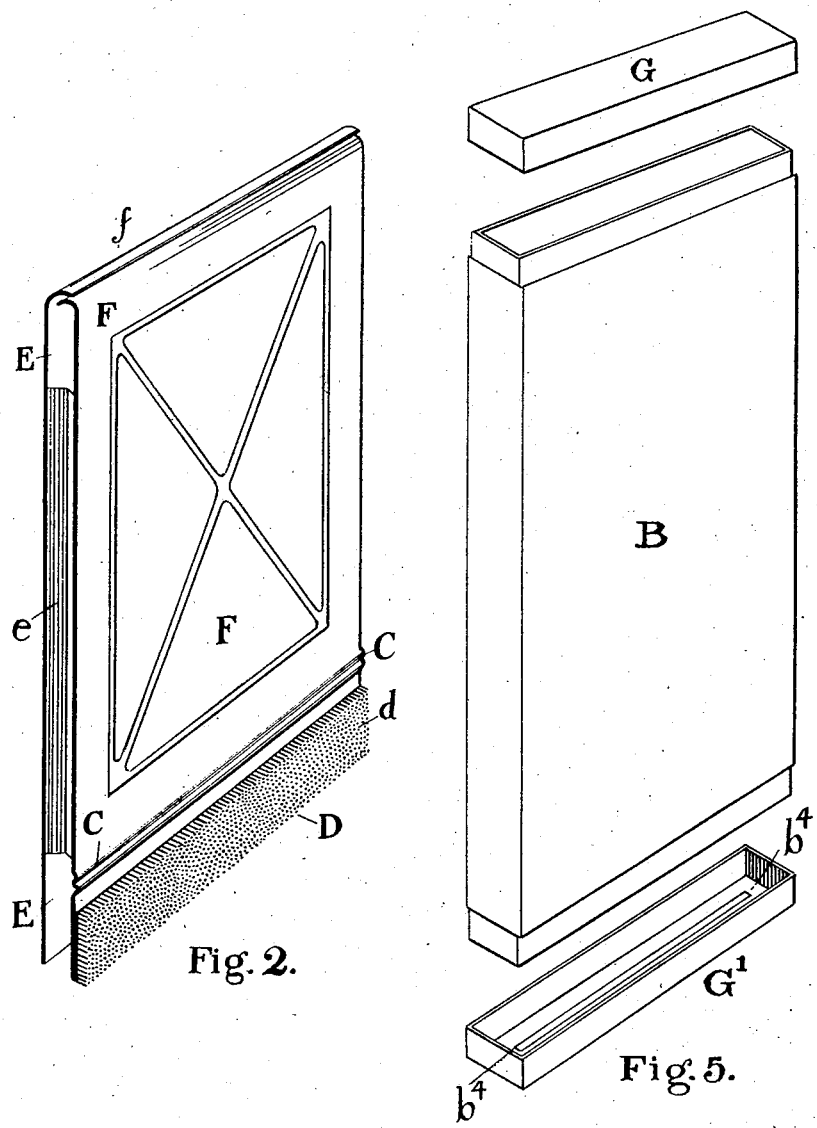

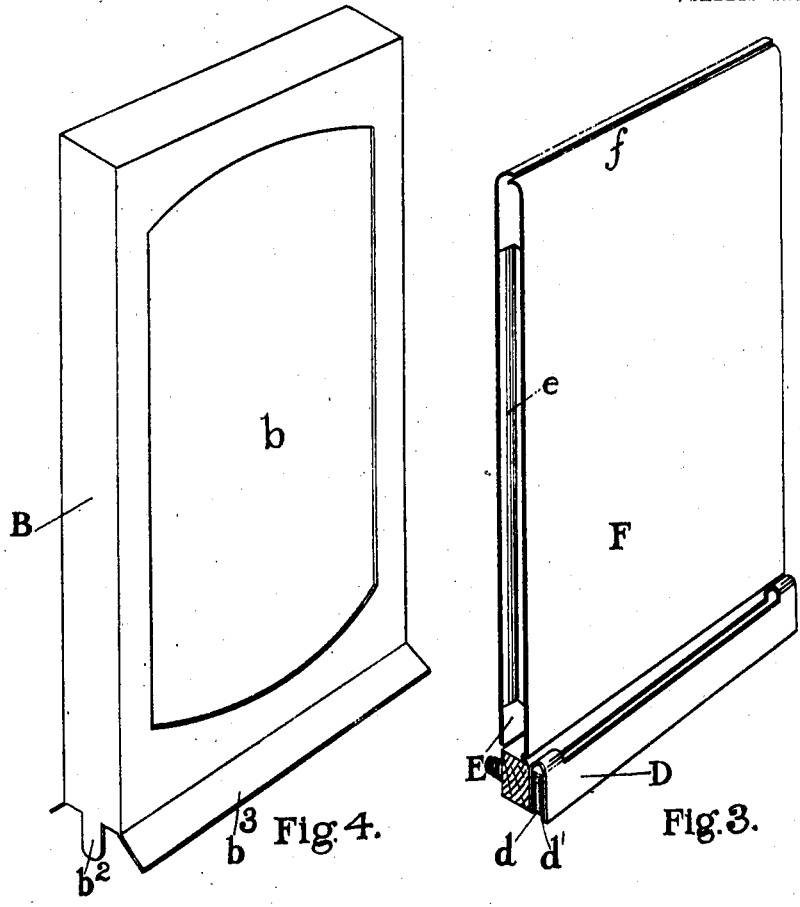

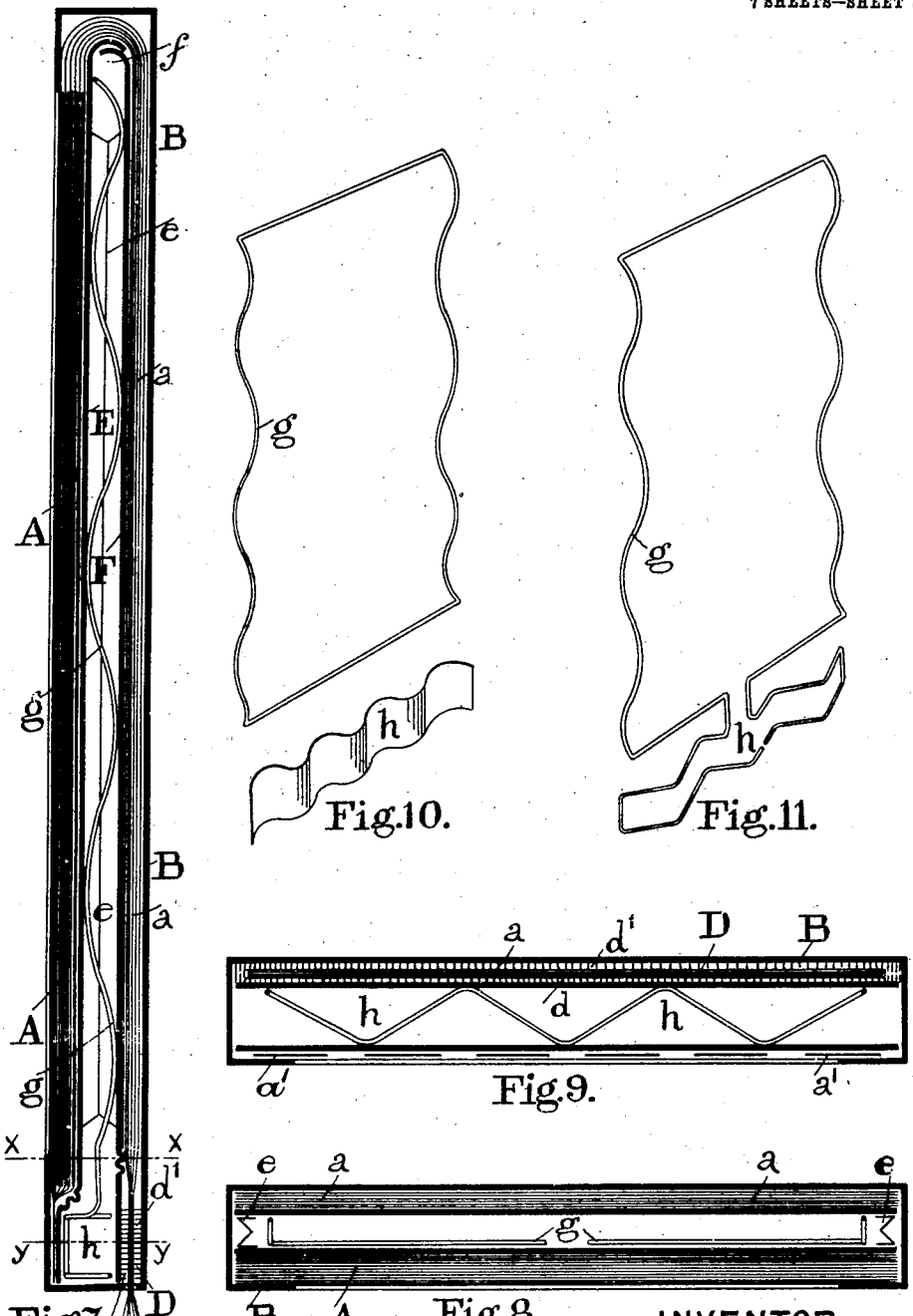

J. E. THORNTON.
DAYLIGHT LOADING FILM PACK.
APPLICATION FILED MAY 20, 1907.

915,126.

Patented Mar. 16, 1909.
7 SHEETS—SHEET 6.

WITNESSES.
E. Howard
Joseph Bates.

INVENTOR
J. E. Thornton
by Iowa & Riley
atty

J. E. THORNTON.
DAYLIGHT LOADING FILM PACK.
APPLICATION FILED MAY 20, 1907.

915,126.

Patented Mar. 16, 1909.
7 SHEETS—SHEET 7.

WITNESSES.
E. Howard
Joseph Bates

INVENTOR.
J. E. Thornton
by D. A. Townsend
atty

UNITED STATES PATENT OFFICE.

JOHN EDWARD THORNTON, OF ALTRINCHAM, ENGLAND.

DAYLIGHT-LOADING FILM-PACK.

No. 915,126.　　　Specification of Letters Patent.　　Patented March 16, 1909.

Application filed May 20, 1907. Serial No. 374,680.

*To all whom it may concern:*

Be it known that I, JOHN EDWARD THORNTON, British subject, and resident of Altrincham, county of Chester, England, have invented certain new and useful Improvements in Daylight-Loading Film-Packs, of which the following is a specification.

This invention relates to daylight-loading film packages (sealed packages of films) known as film packs, and comprises improvements upon my former patent No. 666039.

The object and purpose of the invention is to provide (1) a film pack of simpler and cheaper construction, and (2) one that will maintain the unexposed and the exposed films pressed closely together in their respective piles or bundles, so that they are always kept true in the focal plane for exposure, and are kept in such close contact in both positions that no light can gain ingress between the films; (3) and also in combination with the means for obtaining this result, a simple form of valve or light trap.

The invention will be fully described with reference to the accompanying drawings forming part of the specification.

Figure 1:
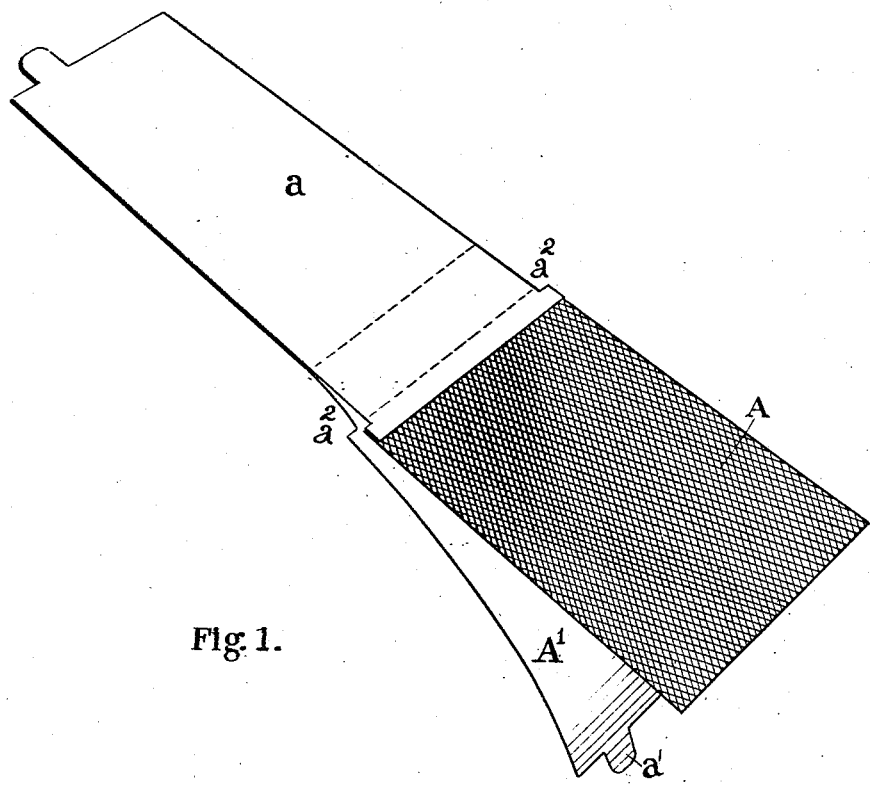
Figure 6:
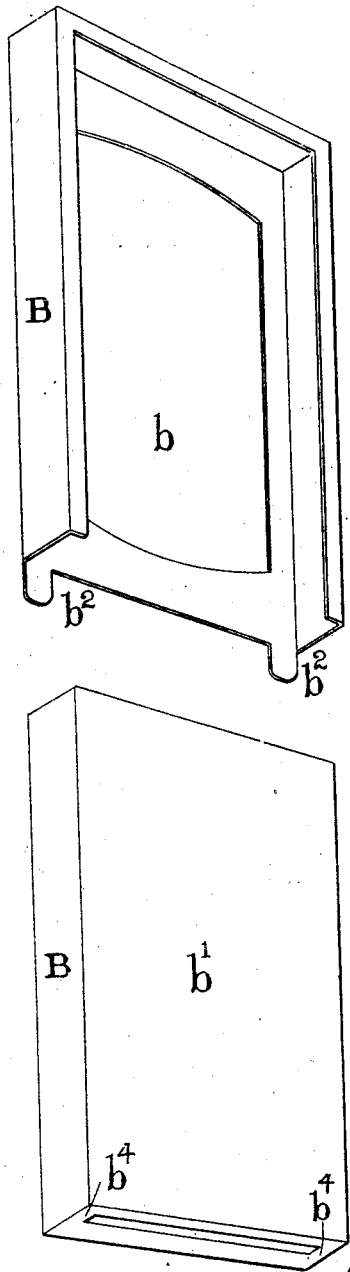
Figure 12:
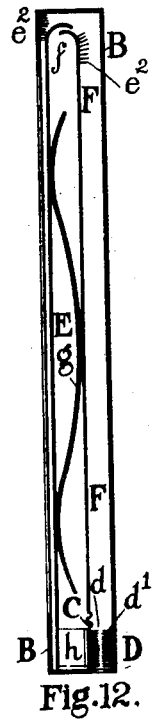
Figure 13:
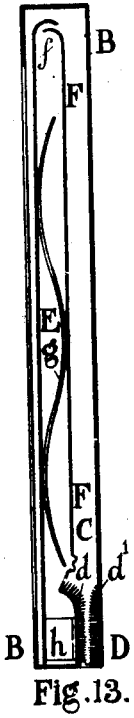
Figures 17, 18, 19, 20, 21:
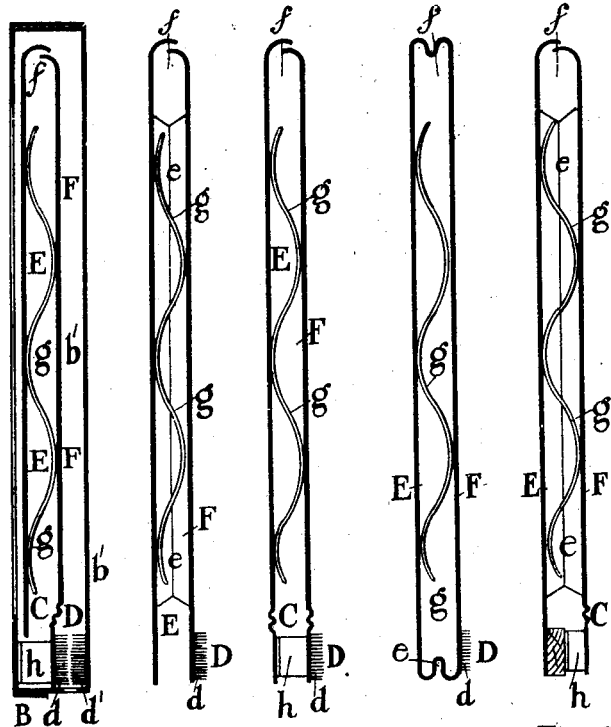

Figure 1. is a perspective view of the tabbed film A. Fig. 2. is a perspective view of the double expanding pressure pad with faces E and F. Fig. 3. is another perspective view of the double expanding pressure pad showing a modified construction of the light valve D. Fig. 4. is a perspective view of the tubular form of outer case or envelop B closed at top and with flaps $b^3$ to close the bottom. Fig. 5. is a perspective view of the tubular form of the outer case or envelop B with end covering caps G and G'. Fig. 6. is a perspective view of outer case or envelop B made with a front part $b$ and a back part $b'$ and clips $b^2$ to secure them together. Fig. 7. is a longitudinal section (drawn to an enlarged scale) showing a complete film pack with the films A in position around the expanding pressure pad placed in the outer case or envelop B. Fig. 8. is a sectional plan of same on line $x$—$x$., Fig. 7. Fig. 9. is a sectional plan of same on line $y$—$y$., Fig. 7. Figs. 10. and 11. are perspective views of the spring $g$ for pressing the faces E and F of the spring pressure pad apart and the spring $h$ for the light valve D. Figs. 12. to 16. are sectional elevations of the film pack (without films) showing modifications of construction of same and of the light valve D and means for excluding light around the edges of the spring pressure pad. Figs. 17. to 23. are sectional elevations of the spring pressure pad showing further modifications of same and of the light valve D.

In carrying out the invention the improved film pack as a whole comprises the following parts. (*a*) A number of films A with tabs $a$ by which to transfer the films from back to front of the case and opaque backing A', to prevent light passing through from one film to the one behind it, and with retaining tabs $a'$ on the lower edge. (*b*) Shoulders $a^2$ on the films to prevent the films being drawn out of the case, and retaining tabs $a'$ by which the films are held in position in the case B. (*c*) A light tight outer case or envelop B to hold the films which serves both as the packing case, storage case and exposing case or holder. (*d*) A double expanding spring pad or pressure plate with front and back faces E and F which (as the film pack leaves the factory, and before use) divides the case into three parts, the center being occupied by the pad, the front by the pile of unexposed films, and the back by the extension tabs attached thereto; but which when all the films have been exposed, divides the case into two parts, the front being occupied by the pad, and the back occupied by the whole of the exposed films minus their severed tabs; and which also serves to close and make the package light-tight, after use. (*e*) Plush (or like) brushes to effect light-tight joints between case and pressure pad, and also to afford yielding edges that tend to prevent friction lines on the films. (*f*) A light-tight valve D permitting the manipulating tabs to pass from the inside to the outside of the case. (*g*). Stops $b^4$ formed in the case B to engage the film shoulders and prevent the films being entirely withdrawn. (*h*) A safety-cover or flexible shutter to protect the front film of the package from light before exposure. (*i*) Clips for securing or sealing the package, but at the same time permitting the user to open and re-seal the package, when desiring to remove only part of the film contents for development.

The tabbed film A is preferably made as shown with the tab $a$ and opaque backing A' in one piece, the tab being cemented at one edge to the top edge of the film and then folded back upon itself to form the opaque backing as shown in Fig. 1. The folded parts are cemented together and the shoulders $a^2$ are formed by cutting away a portion of the tab, and at the lower edge retaining tabs $a'$ are formed which are secured to hold the film in position when the adjacent one is being operated. (See Fig. 1.) The films may however be made as described in my former United States Patent 666039 or with the film and backing in one piece with an opaque soluble coloring matter in the film, as described in my pending application for United States patent Serial Number 372056 filed 6th day of May 1907.

The light tight case B may be made tubular with an exposure opening $b$ in the front face, permanently closed at one end and at the other end open through which the contents of the pack can be inserted comprising the spring pressure pad, the bundle of films A, and light valve D. The end is closed by flaps $b^3$ held in position by clips $b^2$. The clips $b^2$ are of flexible metal and permit of the case being opened to withdraw a portion of the films for development and enable the pack to be closed again and resealed. (See Fig. 4).

The light tight case B may be constructed in tubular form with caps G G' to cover the ends, one cap G' being slotted to allow the tabs $a$ of the films A to pass through (see Fig. 5). The caps G G' may be of cardboard or metal. In another modification the light-tight case B may be made of two parts which fit together one sliding into the other and secured by clips $b^2$ as in Fig. 6.

The double expanding spring pressure pad is constructed of two plates E and F with a light spring $g$ between them to cause them to expand. The plates E and F may be of metal, card, or wood and the springs $g$ may be of fine wire or thin metal. The two plates E and F are connected together at the side edges, or along the top and bottom edges by hinges or gussets $e$ of cloth, paper or other flexible material which will allow the spring $g$ to expand between them, or the two plates E and F may be formed of one piece of card so bent or creased that the expanding gusset forms part of same as in Fig. 20. In another form two plates E and F of the spring pressure pad may be connected by the spring $g$ between them the spring being secured partly to one plate and partly to the other. The spring $g$ is preferably made of fine metal wire in rectangular form, and crimped or corrugated to give the desired convolutions as in Figs. 10 and 11, or it may be stamped from sheet metal, or it may be otherwise formed. To facilitate easy transference of the films A from one side to the other of the expanding pad, a rounded nose $f$ is formed at the top end by rounding each plate of the pad—say by bending them in a press each in the opposite direction to the other. The combination of the double rounded nose with the expansibility in this spring pad overcomes one of the difficulties existing in previous forms. To insure the films pulling over easily it is necessary that the rounded nose $f$ should be as wide as possible, to obviate the bending of the films over too narrow an edge. With a single division plate, as employed in my former United States patent 666039, the effective width of the edge or nose over which the films are drawn is constantly lessening as each successive film is drawn over; whereby by this expanding pad the effective width of the nose remains practically constant because as the films are removed the plates expand or move apart.

Figure 14:
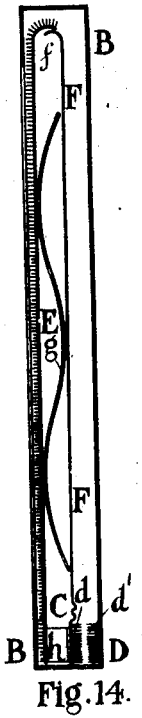
Figure 15:
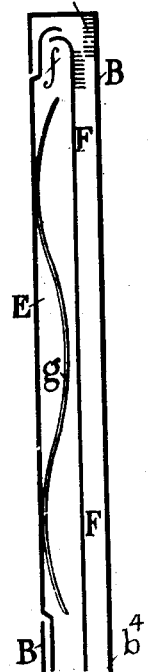

In order to guard against the possibility of the ingress of light around the expanding division pad E F, and passing from front to back thereof, and also to afford soft yielding edges instead of hard rigid ones and thereby prevent the production of friction lines on the film, strips of plush $e^2$ may be applied to any part of the case or pad. For instance narrow strips of plush $e^2$ may be secured near the top front side of the case B, and top back side of the back plate F of the pad, as in Fig. 12. Or if preferred the strips $e^2$ may instead be placed on the inside near the top of the case where such will make contact with the top rounded edges of the two spring plates, or the tabs around them as in Fig. 16. In either case such strips will have the effect of forming a plug which closes the top opening of the front and back film chambers. A strip or covering of plush may also be applied to the plate E of the expansion pad to seal the exposure opening in the case B when all the films have been withdrawn as in Fig. 14.

The light tight valve D through which the manipulating tabs $a$ of the film A pass is built up of two pieces of plush $d\ d'$ in any of the several ways indicated in the drawings, according to the size and style of the outer case B. The valve may be formed of two strips of plush $d\ d'$ the strip $d$ attached to the bottom edge of the back plate F of the expanding pad and the strip $d'$ to the bottom edge of the back of the case B as in Figs. 2, 7, 12, 13, 14, 16, 17, 18, 19 and 20, with the result that when the parts are assembled the film tabs are clipped between the two plush strips. They are pressed closely together on the tabs owing to the spring in the expansion pad, but if necessary a stronger spring $h$ may be placed behind the movable section of the valve.

In order that the pressure of the weak spring $g$ and the strong spring $h$ shall be quite independent, though operating on one plate, I make either the back plate F or the front plate E with a flexible hinge C about half an inch from the bottom edge (either by severing the plate at that point and connecting the two parts by a linen or paper strip; or else, when the plate is formed of cardboard, making one or more creases by any of the well-known forms of bending machines). Thus, although the lower section of this plate carrying the plush strip is pressed up hard by its own spring behind, the upper section is free to float independently under the pressure of its weaker spring. In order that the lower strong spring may not press against the front plate of the pad, the latter may be cut shorter as in Fig. 17, in order to clear the spring and allow it to press against the front flange of the case B.

Figures 22, 23:
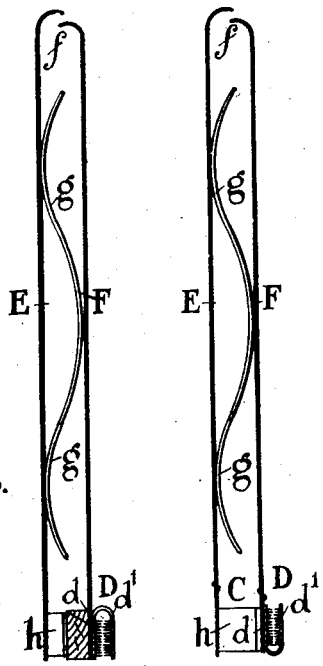

In another form the light valve D may be of two pieces $d\ d'$ linked together, with a slot through which the tabs pass, and attached to a separate block for insertion below the expanding pad E F as in Fig. 3, or such strips may be attached to the back plate F as in Figs. 22 and 23.

Figure 16:
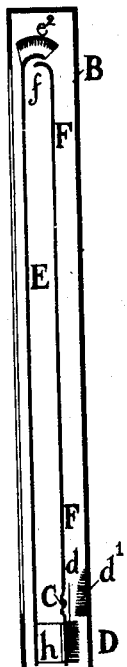

By placing one of the plush strips above the other as in Fig. 16 a tortuous instead of a straight passage for the tabs $a$ of the films A is formed.

The stops which arrest the movement of the films A and prevent them being drawn out of the case B with the tabs $a$ are formed by means of a slot, such as is shown in several of the figures of the drawings, through which the tabs pass. This slot is in length only equal to the width of the tabs $a$, consequently the shoulders $a^2$ formed on the films stop against the ends of the slots and prevent the films being drawn through. The slot may be formed in the bottom of the case, or in the cap that closes it, or by a separate plate inserted therein, or in any other convenient manner. If desired that the shoulders should stop at a point higher up in the case, say half an inch, the folded slotted strip is turned the other way up, so that the shoulders do not enter between the plush faces, as in Fig. 22.

A convenient number of such tabbed backed films A, say 6 or 12, are placed in a pile, and in front of the first one is placed an opaque dummy, which may conveniently be made of two or three separate layers, to which a similar tab is attached, the films are placed around the expanding pad E F and inserted in the case B with the tabs $a$ extending through the light valve D and the retaining tabs $a$ gripped between the spring $h$ and the case, as in Fig. 7. When the daylight loading film pack is thus complete the case B is divided into two chambers with the expanding pad E F between them, thus forming three parts, of which the expanding pad is the center with the films A at one side and the tabs $a$ at the other side. All the films A in the front chamber are kept pressed closely together, so that the front film abuts against the front flange of the case in correct position for exposure. This is the first function of the expanding spring pad E F. When all the films have been exposed and drawn over from the front to the back side of the spring pad E F, the case B is then only divided into two parts, the front one being occupied by the spring pad E F and the back one forming one single chamber containing the whole of the films, the tabs which formerly occupied it having been drawn out of the chamber through the valve D and torn off. The spring pad now performs its second and third functions, viz., its front plate E abuts against the front flange of the case and closes the exposure opening against the entry of light; and its back plate F presses the exposed films so closely together that light and air are effectually excluded and prevented from entering between them, even in case any should enter at the front of the case owing to accidental displacement of the front plate by pressure against the same.

In all previous known forms of daylight loading film packs the unexposed films were pressed together by a single spring follower plate, the springs being carried either by some portion of the case, or by an inner chamber placed within the case. Thus, although the space in the front section before the pressure plate was constantly diminishing as the films were drawn over, the space in the back section was always of the same fixed size, the films lying more or less loosely therein. But with the double expanding spring pad E F the space behind increases and the space before decreases as the films are drawn over, the position of the two plates E F of the double spring pad continually shifting. As the space occupied by the bundle of backed films and bundle of tabs before use is greater than the space occupied by the single bundle of backed films after use, this difference is also taken up and compensated for by the further expansion of the pad.

What I claim as my invention and desire to protect by Letters Patent is:—

1. In a sealed packet for holding flat photographic films for daylight loading, the combination with a light tight inclosing envelop and a light tight valve, of a double expanding floating spring pad comprising plates E and F, a delicate spring placed between the plates and a rounded expanding nose $f$ over which the films are drawn substantially as described.

2. In a sealed packet for holding flat photographic films for daylight loading, the combination with a light tight inclosing envelop and a light tight valve of a double expanding floating spring pad comprising plates E and F, a delicate spring placed between the plates and a light valve D substantially as described.

3. In a sealed packet for holding photographic films for day light loading the combination with a light tight inclosing envelop and a light tight valve of a double expanding floating spring pad comprising plates E and F, flexible joints to connect the plates E and F, a delicate spring placed between the plates, a strip of plush $d$ attached to the back plate F and a spring $h$ to close the valve substantially as described.

4. In a sealed packet for holding photographic films for day light loading, the combination with a light tight inclosing envelop and a light tight valve of a double expanding floating spring pad comprising two plates E and F connected together by flexible joints, rounded top edges forming a double rounded nose $f$, a delicate spring between the plates to expand the two sections of the pad outwardly and press the unexposed and exposed films respectively in opposite directions substantially as described.

5. In a sealed packet for holding flat photographic films for day light loading, the combination with a light tight inclosing envelop and a light tight valve of a double expanding floating spring pad comprising plates E and F flexible joints to connect the plates E and F, a delicate spring being placed between the plates, and strips of plush attached to the case and to the pad to exclude light and prevent scratching of the films substantially as described.

6. A sealed packet of photographic films for daylight loading comprising in its construction a number of flat films A provided with tabs $a$, opaque backing A', retaining tabs $a'$, shoulders $a^2$ a safety cover for the films, a light tight case B, a light valve D, a spring $h$ to close the valve, stops on the case to engage the shoulders $a^2$ of the films and prevent the withdrawal of the films through the valve D, and a double expanding floating spring pad which divides the case into three parts, comprising the two plates E F, flexible joints by which they are connected together, and a delicate spring $g$ by which the plates are forced apart substantially as described.

In witness whereof, I have hereunto signed my name in the presence of two subscribing witnesses.

JOHN EDWARD THORNTON.

Witnesses:
   J. OWDEN O'BRIEN,
   H. BARNFATHER.